US012611808B2

(12) United States Patent      (10) Patent No.:  US 12,611,808 B2
Kozuka                            (45) Date of Patent:      Apr. 28, 2026

(54) MOLDING ASSISTANCE DEVICE FOR INJECTION MOLDING MACHINE

(71) Applicant: NISSEI PLASTIC INDUSTRIAL CO., LTD., Nagano-ken (JP)

(72) Inventor: Makoto Kozuka, Hanishina-gun (JP)

(73) Assignee: NISSEI PLASTIC INDUSTRIAL CO., LTD., Nagano-Ken (JP)

( * ) Notice: Subject to any disclaimer, the term of this patent is extended or adjusted under 35 U.S.C. 154(b) by 133 days.

(21) Appl. No.: 18/292,017

(22) PCT Filed: Jul. 21, 2022

(86) PCT No.: PCT/JP2022/028310
§ 371 (c)(1),
(2) Date: Jan. 25, 2024

(87) PCT Pub. No.: WO2023/008299
PCT Pub. Date: Feb. 2, 2023

(65) Prior Publication Data
US 2024/0359380 A1      Oct. 31, 2024

(30) Foreign Application Priority Data
Jul. 26, 2021    (JP) ................................. 2021-121959

(51) Int. Cl.
*B29C 45/76*          (2006.01)
(52) U.S. Cl.
CPC .... *B29C 45/766* (2013.01); *B29C 2045/7606* (2013.01); *B29C 2945/76939* (2013.01)
(58) Field of Classification Search
CPC .................. B29C 45/76; B29C 45/766; B29C 2045/7606; B29C 2945/76939; B29C 45/78
See application file for complete search history.

(56) References Cited

U.S. PATENT DOCUMENTS 7,144,531 B2 * 12/2006 Kamiguchi ............. B29C 45/76
700/200
2002/0052440 A1 * 5/2002 Tochioka ............ B29C 45/0005
524/494

(Continued)

FOREIGN PATENT DOCUMENTS

JP        2011-505608 A      2/2011
JP        2015-123668 A      7/2015

(Continued)

OTHER PUBLICATIONS

International Search Report (PCT/ISA/210), issued in PCT/JP2022/028310, dated Sep. 20, 2022.

*Primary Examiner* — John J DeRusso
*Assistant Examiner* — Shibin Liang
(74) *Attorney, Agent, or Firm* — Birch, Stewart, Kolasch & Birch, LLP

(57)          ABSTRACT

A molding assistance device includes: a data input section for inputting resin related data including reinforcing fiber data, and molding machine related data including at least screw data; a calculation expression data setting section in which solid phase rate calculation expression data are set, the solid phase rate calculation expression data being used for calculation of a solid phase rate of molten resin containing reinforcing fibers in a heating cylinder on the basis of input data inputted from the data input section and molding condition data set by a molding condition setting section; and a calculation processing functional section which includes at least a solid phase rate calculation processing section and a fiber state calculation processing section. The solid phase rate calculation processing section obtains an estimated solid phase rate of the reinforcing fiber-containing molten resin at the time of completion of metering by calculation processing based on the solid phase rate calculation expression data. The fiber state calculation processing (Continued)

section obtains an estimated breakage rate of the reinforcing fibers at the time of completion of metering.

7 Claims, 7 Drawing Sheets

(56) References Cited

U.S. PATENT DOCUMENTS

| | | | | |
|---|---|---|---|---|
| 2010/0299108 | A1 | 11/2010 | Glaser et al. | |
| 2021/0001528 | A1* | 1/2021 | Kozuka | B29C 45/76 |
| 2021/0379807 | A1* | 12/2021 | Okubo | B29C 45/76 |
| 2022/0134623 | A1 | 5/2022 | Kozuka | |

FOREIGN PATENT DOCUMENTS

| | | | | |
|---|---|---|---|---|
| JP | 2017-217786 A | 12/2017 | | |
| JP | 2020-131600 A | 8/2020 | | |
| WO | 2019/188998 | * 10/2018 | | B29C 45/76 |
| WO | WO 2019/188998 A1 | 10/2019 | | |

* cited by examiner

MOLDING ASSISTANCE DEVICE FOR INJECTION MOLDING MACHINE

TECHNICAL FIELD

The present invention relates to a molding assistance device for an injection molding machine which is preferably used to provide molding assistances for an injection molding machine which injects plasticized molten resin by means of a screw into a mold to fill the mold with the resin, thereby performing molding.

BACKGROUND ART

Generally, an injection molding machine performs a molding operation by injecting plasticized molten resin by means of a screw into a mold to fill the mold with the resin. Thus, whether or not the molten resin can be maintained in an appropriate molten state is an important factor to secure a desirable molding quality. In particular, in the case where plasticization is insufficient, the insufficient plasticization of the molten resin results in a high solid phase rate (unmelted polymer fraction), which causes problems such as lowering of moldability and lowering of molding quality. In the case where plasticization proceeds excessively, the resin decomposition rate (carbonization generation rate) increases, which causes problems such as degeneration of of molten resin and generation of unnecessary gas. Therefore, a technique has been proposed to grasp the state of molten resin in a heating cylinder, thereby enabling performance of necessary countermeasure processing.

Conventionally known techniques of this type are a plasticization simulation device disclosed in Patent Literature 1 and a molding assistance device for an injection molding machine disclosed in Patent Literature 2. The plasticization simulation device disclosed in Patent Literature 1 performs physical quantity calculation processing of calculating at least one physical quantity selected from solid phase rate, temperature, pressure, and plasticization capacity by reference to resin physical properties of a material used in a screw-type plasticization device, operation conditions of the plasticization device, and configuration data of the plasticization device and by using a screw characteristic equation, a mass conservation equation, and an energy conservation equation. In particular, the plasticization simulation device includes an analyzing section which calculates the physical quantity in a state in which the screw is rotating by physical quantity calculation processing, and calculates the physical quantity in a state in which the screw is stopped by using the calculated physical quantity and by using the screw characteristic equation, the mass conservation equation, and the energy conservation equation.

The object of the molding assistance device disclosed in Patent Literature 2 is to enable a novice operator to improve the yield of molded products and molding quality: Specifically, the molding assistance device has a basic data input section for inputting basic data, including molding conditions data relating to molding conditions and screw data related to the form of a screw: a calculation expression data setting section in which solid phase rate calculation expression data for calculation of the solid phase rate of the molten resin in a heating cylinder on the basis of the basic data are set: a calculation processing functional section including a solid phase rate calculation processing section for obtaining an estimated solid phase rate of the molten resin at the time of completion of metering through calculation processing on the basis of the basic data and the solid phase rate calculation expression data; and an output processing functional section which performs display processing for displaying on a display a piece of information relating to the estimated solid phase rate.

PRIOR ART PUBLICATIONS

Patent Publications

Patent Literature 1: JP2015-123668A
Patent Literature 2: WO2019-188998

DISCLOSURE OF THE INVENTION

Problem to be Solved by the Invention

However, the above-described conventional technique for grasping the state of molten resin has the following problem to be solved.

Namely, in the case of the conventional technique, by estimating the solid phase rate and the resin decomposition rate of molten resin, the melting state, plasticization time, resin temperature stability (an index representing the stability of discharged resin), heat generation amount, etc. can be predicted with sufficient accuracy for practical use. However, these estimation and prediction are limited to general-purpose resins.

Meanwhile, the cases where additives are blended to molded products are not few. In particular, in the case of fiber-reinforced plastic containing an additive which maintains its solid state even when the plastic is melted: specifically, reinforcing fibers (e.g., glass fibers or the like) which are high in thermal conductivity and low in specific heat, since their physical properties change drastically, prediction of plasticization time, etc. is not easy. Therefore, conventionally, from the viewpoint of accurately grasping the molten state of molten resin containing reinforcing fibers, a molding assistance device which solves these problems has been demanded.

An object of the present invention is to provide a molding assistance device for an injection molding machine which has solved the above-described problems residing in the background art.

Means for Solving the Problem

The present invention provides a molding assistance device 1 for an injection molding machine M which performs molding assistances for the injection molding machine M which performs molding by injecting plasticized molten resin by means of a screw 3 into a mold 2 so as to fill the mold with the resin. In order to solve the above-described problems, the molding assistance device 1 is configured to comprise:

a data input section Fi for inputting resin related data Dr and molding machine related data Dm, the resin related data Dr including, in addition to resin data representing the type of resin, reinforcing fiber data Drg relating to reinforcing fibers added to the resin, the molding machine related data Dm including at least screw data Dms:

a molding condition setting section Fx for setting molding conditions:

a calculation expression data setting section Fs in which solid phase rate calculation expression data Dsc are set, the solid phase rate calculation expression data Dsc being used for calculation of a solid phase rate Xc of the molten resin containing the reinforcing fibers in a heating cylinder 4 on the basis of input data Di inputted from the data input section Fi and molding condition data Ds set by the molding condition setting section Fx:

a calculation processing functional section Fc which includes at least a solid phase rate calculation processing section Fcp and a fiber state calculation processing section Fcf, the solid phase rate calculation processing section Fcp obtaining an estimated solid phase rate Xcs of the molten resin containing the reinforcing fibers at the time of completion of metering by calculation processing based on the solid phase rate calculation expression data Dsc, the fiber state calculation processing section Fcf obtaining an estimated breakage rate Yn of the reinforcing fibers at the time of completion of metering; and an output processing functional section Fo which performs processing of displaying on a display 5 a piece of information relating to at least one of the estimated solid phase rate Xcs and the estimated breakage rate Yn.

In preferred modes of the present invention, the reinforcing fiber data Drg may contain data representing a type of the reinforcing fibers, an amount of the reinforcing fibers added to the resin, and a fiber length. Decomposition rate calculation expression data Dsr may be set in the calculation expression data setting section Fs. The decomposition rate calculation expression data Dsr are used for calculation of a resin decomposition rate Xr of a screw surface 3f during molding on the basis of the input data Di and the molding condition data Ds. The calculation processing functional section Fc may include a decomposition rate calculation processing section For which obtains an estimated resin decomposition rate Xrs by calculation processing based on the input data Di, the molding condition data Ds, and the decomposition rate calculation expression data Dsr. The fiber state calculation processing section Fcf may have a function of obtaining an estimated final fiber length Yf of the reinforcing fibers at the time of completion of metering. The calculation processing functional section Fc may include a judgment processing section Fcj which performs judgment processing for the magnitude of at least one of the estimated solid phase rate Xcs, the estimated breakage rate Yn, the estimated final fiber length Yf, and the estimated resin decomposition rate Xrs, and outputs assistance message data md corresponding to a judgment result mj of the judgment processing. Notably, the calculation processing functional section Fc desirably includes an optimization processing section Fce which sets constraints based on mathematical programing for the molding conditions and obtains at least one of optimized values of the estimated solid phase rate Xcs, the estimated breakage rate Yn, and the estimated resin decomposition rate Xrs of the reinforcing fiber-containing molten resin in the heating cylinder 4. The output processing functional section Fo may have a function of displaying an assistance message mdd on a message display section 5v of the display 5. The assistance message mdd is based on the assistance message data md outputted from the judgment processing section Fcj.

Effects of the Invention

Significant effects as shown below are provided by the molding assistance device 1 for the injection molding machine according to the present invention described above.

(1) Even in the case of use of resin containing reinforcing fibers (fiber-reinforced plastic) in which physical properties change drastically and prediction of plasticization time, etc. is not easy, since the visualization of its molten state becomes possible, the molten state of the reinforcing fiber-containing molten resin at the time of completion of metering can be grasped accurately. Thus, human judgment, which requires experience, etc., becomes unnecessary, and even a novice operator who does not have much experience can reduce molding defects and maintenance work and can improve the yield of molded products and molding quality. Accordingly, more desired molding (production) can be performed.

(2) In the preferred mode in which data representing the type of the reinforcing fibers, the amount of the reinforcing fibers added to the resin, and the fiber length are contained in the reinforcing fiber data Drg, since the reinforcing fiber data Drg can sufficiently cover elements for visualization of the reinforcing fibers, the change state (breakage state, etc.) of the reinforcing fibers, contained in the molten state of molten resin, can be grasped accurately.

(3) In the preferred mode in which the decomposition rate calculation expression data Dsr for calculation of the resin decomposition rate Xr of the screw surface 3f during molding on the basis of the input data Di and the molding condition data Ds are set in the the calculation expression data setting section Fs, the estimated resin decomposition rate Xrs can be easily obtained, because the input data Di used for the calculation processing of the solid phase rate calculation expression data Dsc can also be used for the calculation processing of the decomposition rate calculation expression data Drs, for example.

(4) In the preferred mode in which the decomposition rate calculation processing section Fcr for obtaining the estimated resin decomposition rate Xrs by calculation processing based on the input data Di, the molding condition data Ds, and the decomposition rate calculation expression data Dsr is provided in the calculation processing functional section Fc, since the estimated resin decomposition rate Xrs can be easily obtained by calculation processing, it is possible to accurately grasp the deteriorated state of molten resin from the estimated resin decomposition rate Xrs. Accordingly, it becomes possible to set a proper range of the molten state by two limit points: i.e., a limit point on one side (side where plasticization is insufficient) of the range of the molten state determined by the estimated solid phase rate Xcs and a limit point on the other side (side where plasticization is excessive) of the range of the molten state determined by the estimated resin decomposition rate Xrs. Thus, moldability and molding quality can be further enhanced.

(5) In the preferred mode in which the function of obtaining the estimated final fiber length Yf of the reinforcing fibers at the time of completion of metering is provided in the fiber state calculation processing section Fcf, since the change state of the reinforcing fibers can be grasped accurately by combining the estimated final fiber length Yf with the estimated breakage rate Yn, the strength and quality of molded products can be further increased by optimizing the state of reinforcing fibers in the molded products.

(6) In the preferred mode in which the judgment processing section Fcj which performs judgment processing for the magnitude of at least one of the estimated solid phase rate Xcs, the estimated final fiber length Yf, the estimated breakage rate Yn, and the estimated resin decomposition rate Xrs, and outputs assistance message data md corresponding to the judgment result mj of the judgment processing is provided in the calculation processing functional section Fc, an operator can easily grasp the molten state of the molten resin, which is difficult to judge, and can quickly perform necessary countermeasure processing.

(7) In the preferred mode in which the optimization processing section Fce which sets constraints based on mathematical programing for the molding conditions and obtains at least one of optimized values of the estimated solid phase rate Xcs, the estimated final fiber length Yf, the estimated breakage rate Yn, and the estimated resin decomposition rate Xrs of the reinforcing fiber-containing molten resin in the heating cylinder 4 is provided in the calculation processing functional section Fc, the fiber orientation, fiber length, and the state of dispersion within molded products and the strength of the molded products can be predicted in more detail by reflecting the above-described optimized values on resin flow analysis software or the like.

(8) In the preferred mode in which the function of displaying an assistance message mdd based on the assistance message data md outputted from the judgment processing section Fcj on a message display section 5v of the display 5 is provided in the output processing functional section Fo, the operator can easily grasp the molten state of the molten resin, which is difficult to judge, by the visual means and can quickly perform necessary countermeasure processing. Therefore, production of molded products can be made more efficient.

BRIEF DESCRIPTION OF THE DRAWINGS

FIG. 2 Block system diagram of an injection molding machine including the molding assistance device.

FIG. 3 View showing an input screen of the display provided in the molding assistance device.

DESCRIPTION OF REFERENCE NUMERALS

Figure 1:
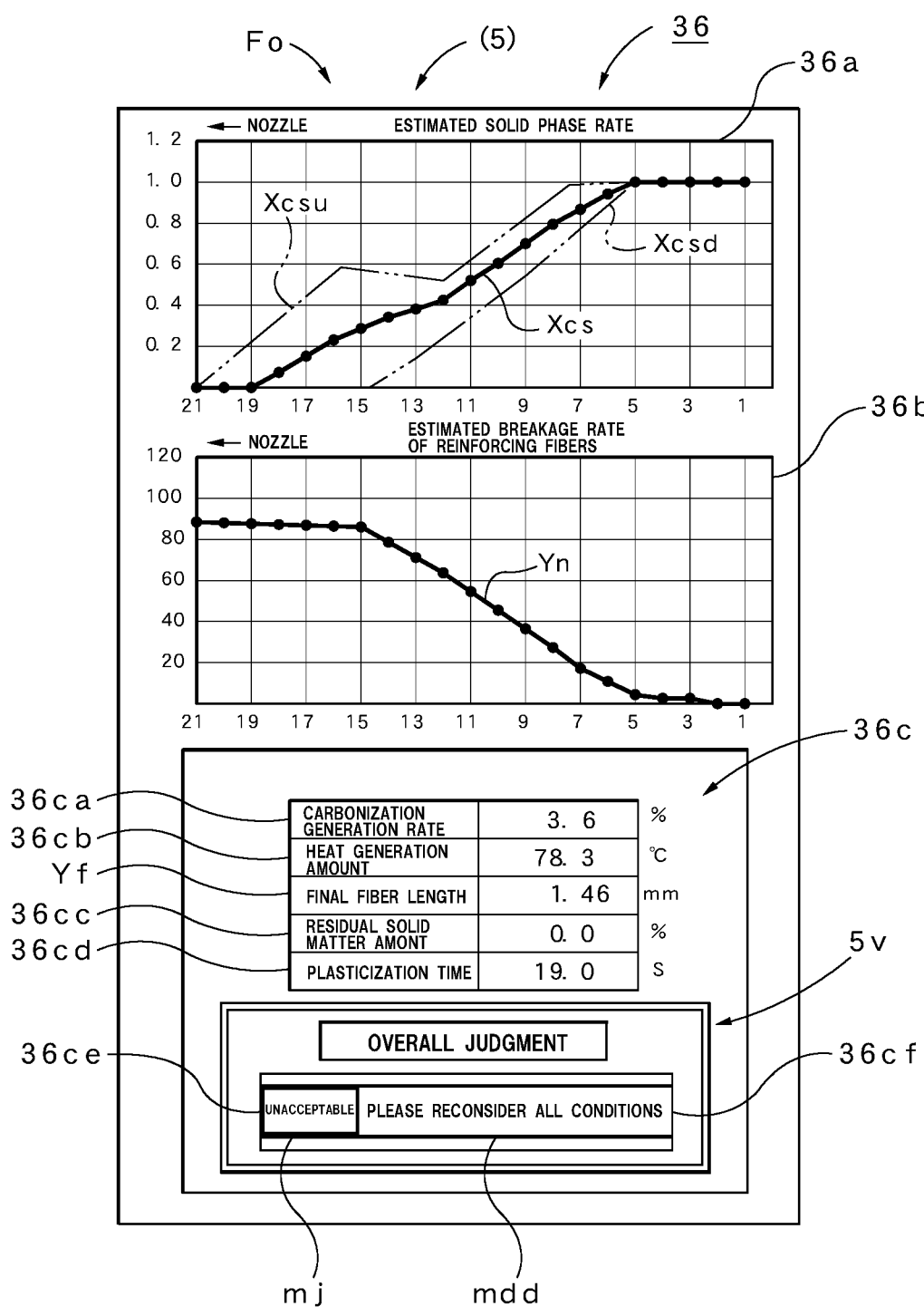
FIG. 1 View showing an output screen of a display provided in a molding assistance device according to a preferred embodiment of the present invention.

1: molding assistance device, 2: mold, 3: screw; 3f: screw surface, 4: heating cylinder, 5: display, 5v: message display section, M: injection molding machine, Dr: resin related data, Drg: reinforcing fiber data, Dm: molding machine related data, Dms: screw data, Di: input data, Ds: molding condition data, Dsc: solid phase rate calculation expression data, Dsr: decomposition rate calculation expression data, Da: assistance message data, Das: assistance message, Fi: data input section, Fx: molding condition setting section, Fs: calculation expression data setting section, Fc: calculation processing functional section, Fcp: solid phase rate calculation processing section, Fcr: decomposition rate calculation processing section, Fcf: fiber state calculation processing section, Fcj: determination processing section, Fo: output processing functional section, Xcs: estimated solid phase rate, Yf: estimated final fiber length, Yn: estimated breakage rate

BEST MODE FOR CARRYING OUT THE INVENTION

Next, the best embodiment of the present invention will be described with reference to the drawings.

First, in order to facilitate understanding of a molding assistance device 1 according to the present embodiment, an injection molding machine M for which the molding assistance device 1 can be used will be described with reference to FIG. 2.

Figure 2:
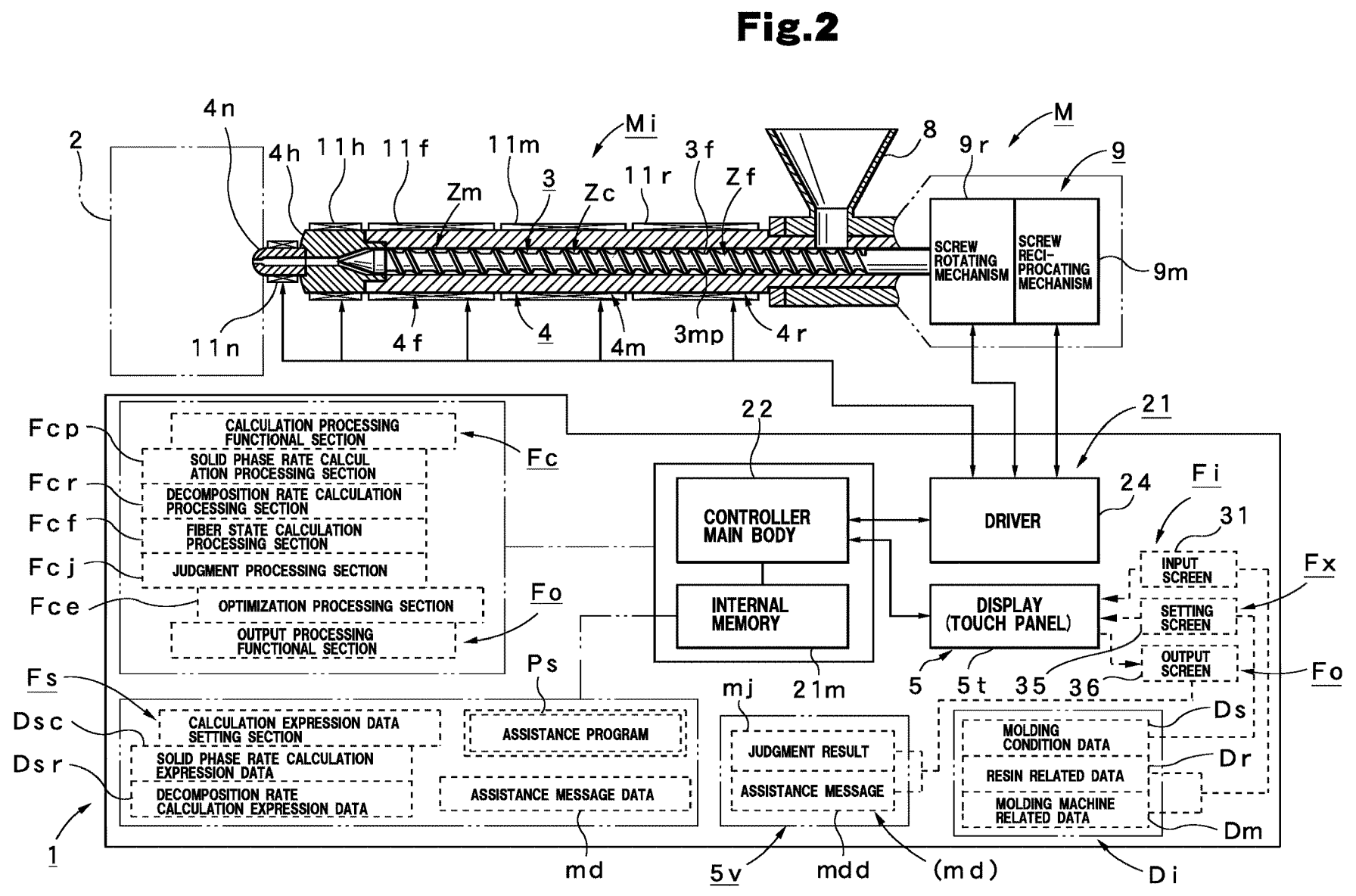

FIG. 2 shows the injection molding machine M and in particular, an injection device Mi, in which a clamping device is omitted. In the injection device Mi, reference numeral 4 denotes a heating cylinder. A nozzle 4n is fixedly attached to a forward end portion of this heating cylinder 4 via a head portion 4h. The heating cylinder 4 has a hopper 8 at the upper side of a rear end thereof. The nozzle 4n has a function of injecting molten resin in the heating cylinder 4 to a metal mold 2 shown by an imaginary line. The hopper 8 has a function of supplying a resin material (resin pellets) to the interior of the heating cylinder 4.

A screw 3 is disposed in the heating cylinder 4 in such a manner that the screw 3 can be rotated and reciprocated freely. A spiral flight section 3mp is formed on the surface of the screw 3. The screw surface 3f is coated with a predetermined surface material (metal) chosen in consideration of durability, etc. This screw 3 has a metering zone Zm, a compression zone Zc, and a feed zone Zf in this order from the forward side to the rear side. A screw driving section 9 is coupled to a rear end portion of the screw 3. The screw driving section 9 includes a screw rotating mechanism 9r for rotating the screw 3 and a screw reciprocating mechanism 9m for moving the screw 3 forward and rearward. Notably, the screw rotating mechanism 9r and the screw reciprocating mechanism 9m may be driven by any driving method such as a hydraulic method using a hydraulic circuit or an electrical method using an electric motor.

The heating cylinder 4 has a heating cylinder forward portion 4f, a heating cylinder middle portion 4m, and a heating cylinder rear portion 4r in this order from the forward side to the rear side. A forward portion heating section 11f, a middle portion heating section 11m, and a rear portion heating section 11r are respectively provided on the outer circumferential surfaces of these portions 4f, 4m, and 4r. Similarly, a head heating section 11h is provided on the outer circumferential surface of the head portion 4h, and a nozzle heating section 11n is provided on the outer circumferential surface of the nozzle 4n. Each of these heating sections 11f, 11m, 11r, 11h, and 11n may be composed of a band heater or the like.

Reference numeral 21 denotes a molding machine controller which performs overall control of the injection molding machine M. The molding machine controller 21 includes a controller main body 22 which includes pieces of hardware such as a CPU and an accompanying internal memory 21m and has a computer function. A display 5 accompanying the controller main body 22 is connected to a connection port of the controller main body 22, and a driver 24 for driving (operating) various actuators is connected to the connection port. In this case, the display 5 can display required pieces of information and includes a touch panel 5t. This touch panel 5t can be used to perform various operations such as input, setting, and selection operations. The screw rotating mechanism 9r and the screw reciprocating mechanism 9m described above are connected to the driver 24, and the respective heating sections 11f, 11m, 11r, 11h, and 1 In are connected to the driver 24. This allows the controller main body 22 to control, via the driver 24, the driving of the screw rotating mechanism 9r and the screw reciprocating mechanism 9m and to control the energization of the respective heating sections 11f, 11m, 11r, 11h, and 11n.

Thus, the molding machine controller 21 includes an HMI (human-machine interface) control system and a PLC (programmable logic controller) control system. The internal memory 21m stores therein a PLC program and an HMI program. Notably, the PLC program is a piece of software for realizing, for example, sequence operations of various steps in the injection molding machine M and monitoring of the injection molding machine M. The HMI program is a piece of software for realizing, for example, setting and display of operation parameters of the injection molding machine M and display of operation monitoring data of the injection molding machine M.

Next, the configuration of the molding assistance device 1 according to the present embodiment that can be used for such an injection molding machine M will be described with reference to FIG. 1 to FIG. 8.

The molding assistance device 1 according to the present embodiment is configured by using the controller main body 22 and the display 5, which constitute the above-described molding machine controller 21. Therefore, the internal memory 21m of the controller main body 22 stores therein an assistance program Ps (an application program) which allows the molding assistance device 1 to function.

Figure 3:
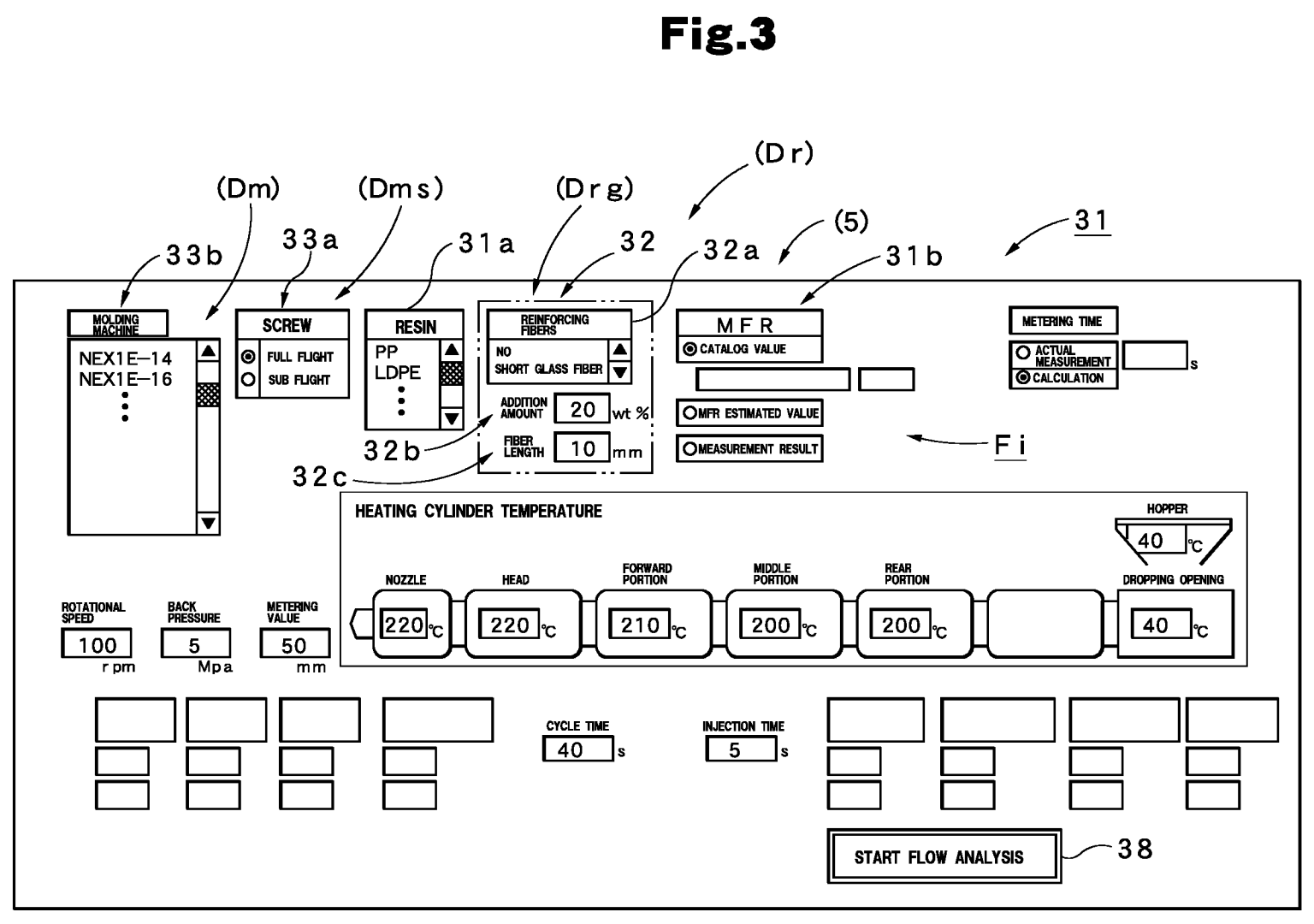

As shown in FIGS. 2 and 3, the molding assistance device 1 includes a data input section Fi which allows input of at least resin related data Dr, which include, in addition to resin data representing the type of resin, data representing the type of reinforcing fibers added to the resin, the addition amount, and the fiber length, and molding machine related data Dm including at least screw data. The touch panel 5t added to the display 5 is used for the data input section Fi.

FIG. 3 shows an input screen 31 which also has a setting function based on the assistance program Ps. This input screen 31 is displayed on the display 5. In this case, an upper section of the input screen 31 functions as the data input section Fi and includes a resin selection section 31a, a flowability input section 31b, and a reinforcing fiber input section 32 for inputting the resin-related data Dr. The resin selection section 31a is used to input the resin data by selecting the type of resin. The flowability input section 31b is used to input the flowability of molten resin. The reinforcing fiber input section 32 is used to input pieces of information relating to reinforcing fibers.

The reinforcing fiber input section 32 includes a fiber type input section 32a for inputting the type of the reinforcing fibers, an addition amount input section 32b, and a fiber length input section 32c. The reinforcing fiber data Drg are inputted by using these input sections. In the case where, as described above, data representing the type of the reinforcing fibers, the amount of the reinforcing fibers added to the resin, and the fiber length are contained in the reinforcing fiber data Drg, since the reinforcing fiber data Drg can sufficiently cover elements for visualization of the reinforcing fibers, the change state (breakage state, etc.) of the reinforcing fibers, contained in the molten state of molten resin, can be grasped accurately. Notably, in the case where the data representing the flowability of molten resin is contained in the resin related data Dr, a value described in a catalog, an estimated value, and a measured value can be selected and used as the flowability of molten resin. Accordingly, by selecting (inputting) chosen appropriate data, a more desirable molten state can be grasped.

A screw selection section 33a for selecting the type of the screw and a molding machine selection section 33b for selecting the type of the molding machine are provided so as to input the molding machine related data Dm. By selecting the type of the molding machine, heating cylinder data, etc. which relate to the molding machine are selected. Notably, as a result of input of the screw data Dms, a plurality of various data relating to the screw are selected, which include data relating to various dimensions (e.g., a screw outer diameter, a screw flight width, a friction coefficient between a piece of solid matter and the screw; a screw groove depth, a screw width direction length, a screw lead, a flight coefficient, a screw flight torsion angle, and a pitch number) and data relating to the type of material of the screw surface 3f. In particular, in the case where the data relating to the type of material of the screw surface 3f is contained in the screw data Dms, since causes of degradation (e.g., the catalyst effect by the metal material of the screw; surface 3f on molten resin and easiness of adhesion) can be reflected on calculation of an estimated resin decomposition rate Xrs, a more accurate (or precise) estimated resin decomposition rate Xrs can be obtained.

Furthermore, as shown in FIG. 2, a setting screen 35 is displayed on the display 5. Although concrete illustration of this setting screen 35 is omitted, this setting screen 35 functions as a molding condition setting section Fx. For example, various types of molding condition data Ds, such as screw rotational speed, metering time, back pressure, metering position, forward portion temperature, middle portion temperature, rear portion temperature, cycle time, can be set by using the setting screen 35. Setting of these data can be performed by: for example, input or selection of necessary numerical values through the touch panel 5t.

The molding assistance device 1 includes a calculation expression data setting section Fs stored in the internal memory 21m. In this calculation expression data setting section Fs, solid phase rate calculation expression data Dsc and decomposition rate calculation expression data Dsr are set. The solid phase rate calculation expression data Dsc are data relating to a calculation expression for calculation of the solid phase rate $Xc$ of molten resin in the heating cylinder 4 on the basis of the above-described input data Di and molding condition data Ds. The decomposition rate calculation expression data Dsr are data relating to a calculation expression for calculation of the resin decomposition rate $Xr$ of the screw surface 3f during molding on the basis of the above-described input data Di and molding condition data Ds. In the case where the decomposition rate calculation expression data Dsr are set in addition to the solid phase rate calculation expression data Dsc, the estimated resin decomposition rate Xrs can be easily obtained, because the input data Di used for the calculation processing of the solid phase rate calculation expression data Dsc can also be used for the calculation processing of the decomposition rate calculation expression data Dsr, for example.

The solid phase rate calculation expression proposed by the present applicant in the republished patent publication WO2019-188998 can be utilized as a solid phase rate calculation expression for calculation of the solid phase rate Xc which is the base of the solid phase rate calculation expression data Dsc. Namely, Expression 101 can be used.

$$\text{Solid Phase rate } Xc = Cx/Cw \qquad \text{Expression 101}$$

$$= (Cx'/Cw) \cdot (1 - ka \cdot \Phi i)$$

$$\text{where } \Phi i = f(Tr, Tc) \cdot \Phi e.$$

In these expressions, Cx represents the width of a piece of solid matter at the current position, Cw represents a length obtained by subtracting the flight width from the pitch width, Cx' represents the width of the piece of solid matter one pitch earlier, ka represents an adjustment coefficient, $\Phi i$ represents a melting rate during injection, $\Phi e$ represents a melting rate during extrusion, Tr represents a metering time, and Tc represents a cycle time.

The decomposition rate calculation expression proposed by the present applicant in the republished patent publication WO2019-188998 can also be utilized as a decomposition rate calculation expression for calculation of the resin decomposition rate Xr which is the base of the decomposition rate calculation expression data Dsr. Namely, Expression 102 can be used.

$$\text{Resin decomposition rate } Xr = E \cdot Wa \cdot kb \qquad \text{Expression 102}$$

$$\text{where } E = f(W, L, \sigma, \gamma, \xi)$$

$$Wa \propto f(\Phi m, \Phi c, Qs).$$

In these expressions, E represents a shearing heat generation amount [MJ] calculated based on the Tadmor model expression that is a total shear heat generation amount obtained by integrating the shearing heat generation amounts in a range from a fully-melted position to a tip end of the screw 3. Wa represents the adhesion work [MJ/m2] of molten resin and metal, and kb represents an adjustment coefficient determined in consideration of the catalyst effect of the metal. In calculation of the shearing heat generation amount E, W represents the length obtained by subtracting the flight width from the pitch width, L represents a screw spiral length, $\sigma$ represents a shearing stress, $\gamma$ represents a shearing rate, and $\xi$ represents a dimensionless depth. In calculation of the adhesion work Wa, $\Phi m$ represents the work function of the base material metal, $\Phi c$ represents the work function of the metal coated on the base material metal, and Qs represents the amount of oxygen adhering to the outermost surface metal. The oxygen amount Qs can be measured by an X-ray analysis device (EDX device). This adhesion work Wa shows how easily molten resin adheres to the metal.

In the case where, as described above, the decomposition rate calculation expression data Dsr, which are used to obtain the resin decomposition rate Xr of the screw surface 3f on the basis of the input data Di and the molding condition data Ds, are set in the calculation expression data setting section Fs, the estimated resin decomposition rate Xrs can be easily obtained, because the input data Di used for the calculation processing of the solid phase rate calculation expression data Dsc can also be used for the calculation processing of the decomposition rate calculation expression data Drs, for example.

Furthermore, the molding assistance device 1 includes a calculation processing functional section Fc shown in FIG. 2. This calculation processing functional section Fc performs calculation processing by using the above-described solid phase rate calculation expression data Dsc and the above-described decomposition rate calculation expression data Dsr. This calculation processing functional section Fc includes a fiber state calculation processing section Fcf for obtaining an estimated final fiber length Yf and an estimated breakage rate Yn of reinforcing fibers at the time of completion of metering.

In this case, the molding assistance device 1 includes a solid phase rate calculation processing section Fcp for obtaining the solid phase rate Xc of molten resin at the time of completion of metering (i.e., the estimated solid phase rate Xcs) through calculation processing based on the input data Di and the solid phase rate calculation expression data Dsc. In practice, the obtained, estimated solid phase rate Xcs is not necessarily required to be 0). A numerical value of "0.06" is desirably chosen as a judgment criterion, and this numerical value was confirmed from the results of an experiment. Therefore, in the case where the estimated solid phase rate Xcs satisfies the relation of "Xcs≤0.06," it is possible to judge that the resin is in a good molten state, and in the case where "Xcs>0.06," it is possible to judge that melting is insufficient (plasticization is insufficient). As described above, the magnitude of the estimated solid phase rate Xcs serves as an index which shows the molten state (e.g., plasticization of molten resin is insufficient). Notably, since the estimated solid phase rate Xcs shows the melting level of molten resin, the unmelted polymer fraction may be used.

Also, the molding assistance device 1 includes a decomposition rate calculation processing section Fcr for obtaining the resin decomposition rate Xr of molten resin (i.e., the estimated resin decomposition rate Xrs) through calculation processing based on the input data Di and the decomposition rate calculation expression data Dsr. In the case where the obtained, estimated resin decomposition rate Xrs is greater than 0.00, it is possible to grasp that molten resin is in a deteriorated state (including the case where the risk that the molten resin becomes a deteriorated state is high). Specifically, in the case where the estimated resin decomposition rate Xrs satisfies the relation of "Xrs=0.00," it is possible to judge that the molten resin has not deteriorated and is in a good molten state, and in the case where "Xrs>0.00," it is possible to judge that the molten resin is in a deteriorated state or the risk that the molten resin becomes a deteriorated state is high. As described above, the magnitude of the estimated resin decomposition rate Xrs serves as an index which shows the deteriorated state of molten resin which occurs as a result of excessive progress of plasticization.

In the case, as described above, the decomposition rate calculation processing section Fcr for obtaining the estimated resin decomposition rate Xrs through calculation processing based on the input data Di, the molding condition data Ds, and the decomposition rate calculation expression data Dsr is provided in the calculation processing functional section Fc, since the estimated resin decomposition rate Xrs can be easily obtained by the calculation processing, it is possible to accurately grasp the deteriorated state of molten resin from the estimated resin decomposition rate Xrs. Accordingly, it becomes possible to set a proper range of the molten state by two limit points: i.e., a limit point on one side (side where plasticization is insufficient) of the range of the molten state determined by the estimated solid phase rate Xcs and a limit point on the other side (side where plasticization is excessive) of the range of the molten state determined by the estimated resin decomposition rate Xrs. Thus, moldability and molding quality can be further enhanced.

Figure 4:
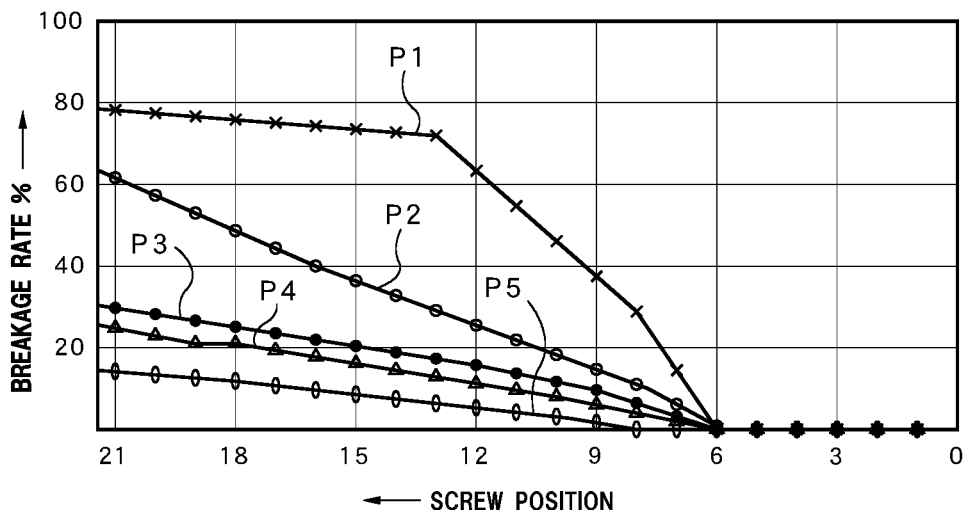
FIG. 4 Characteristic chart showing changes in reinforcing fiber breakage amount with screw position which was used in analysis of the molding assistance device.

Furthermore, the fiber state calculation processing section Fcf can estimate the breakage rate Yn of the reinforcing fibers on the basis of the input data Di by using a previously set calculation expression, data table, or the like. FIG. 4 shows the results of simulation performed by the assistance program Ps so as to obtain the relation between screw position and the breakage rate Yn [%] in the heating cylinder 4. In FIG. 4, a curve P1 (sample 1) shows the above-described relation for the case where "long glass fibers" were added to polypropylene resin (PP) in an amount of 30 [wt %], a curve P2 (sample 2) shows the above-described relation for the case where "long glass fibers" were added to PP in an amount of 10 [wt %], a curve P3 (sample 3) shows the above-described relation for the case where "short glass fibers" were added to PP in an amount of 30 [wt %], a curve P4 (sample 4) shows the above-described relation for the case where "short glass fibers" were added to PP in an amount of 10 [wt %], and a curve P5 (sample 5) shows the above-described relation for the case where "short glass fibers" were added to polyamide 66 resin (PA66) in an amount of 30 [wt %]. In the cases shown in FIG. 4, the sample 5 shows the situation where reinforcing fibers are most unlikely to be broken. Conceivably, the reason of this is that the viscosity of the resin is low and the plasticization time is short.

Accordingly, in the fiber state calculation processing section Fcf, such characteristic curves are registered in the form of a data table, and the type of resin, the type of reinforcing fibers, the addition amount of reinforcing fibers, the molding conditions, etc. are linked to the data table. Thus, on the basis of the input data Di, corresponding characteristic curve P1, etc. can be selected and displayed.

Furthermore, the fiber state calculation processing section Fcf has a function of obtaining the estimated final fiber length Yf of reinforcing fibers at the time of completion of metering. In the case where the function of obtaining the estimated final fiber length Yf is provided, since the change state of the reinforcing fibers can be grasped accurately by combining the estimated final fiber length Yf with the estimated breakage rate Yn, the strength and quality of molded products can be increased by optimizing the state of reinforcing fibers in the molded products.

Data of the estimated final fiber length Yf were obtained by sampling a last portion of discharged resin and actually measuring the remaining fibers by an ashing method.

Figure 5:
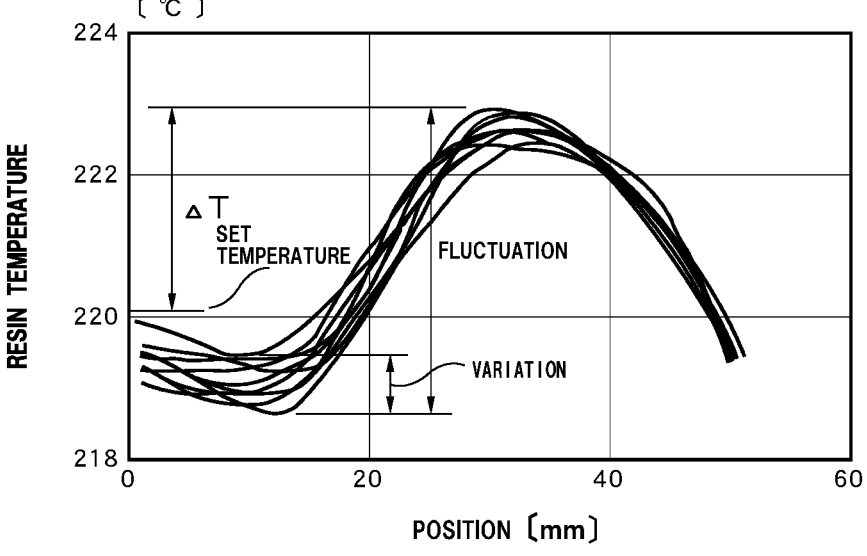
FIG. 5 Characteristic chart showing the relation between screw position and resin temperature which is used for describing the definition of fluctuation used in analysis of the molding assistance device.

Meanwhile, verification regarding consistency was performed. First, in addition to the actual plasticization time, as shown in FIG. 5, the temperature difference between the maximum temperature and the minimum temperature of resin (discharged resin) at the time of discharge from the nozzle was determined from the measured resin temperature and analyzed as fluctuation (resin temperature stability). The weight stability of molded products can be grasped from this resin temperature stability.

For the resin containing reinforcing fibers, the relation between predicted heat generation amounts and measured values of the plasticization time, the resin temperature stability, the final fiber length of glass fibers in discharged resin was verified, while the shape of the screw and the molding conditions, and the addition amount were changed.

Figure 6:
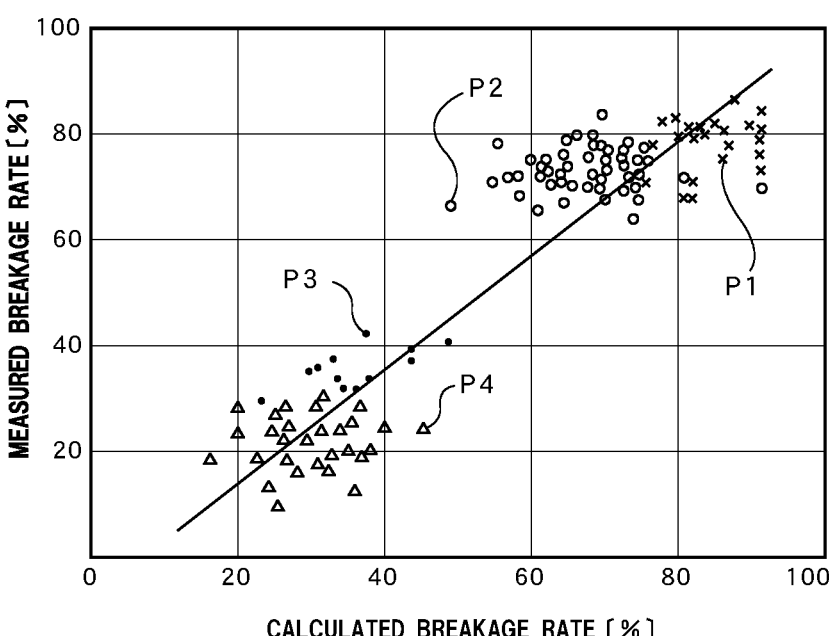
FIG. 6 Characteristic chart showing the correlation between calculated breakage rate and measured breakage rate for different weight-average fiber lengths, which was used for verification of the molding assistance device.
Figure 7:
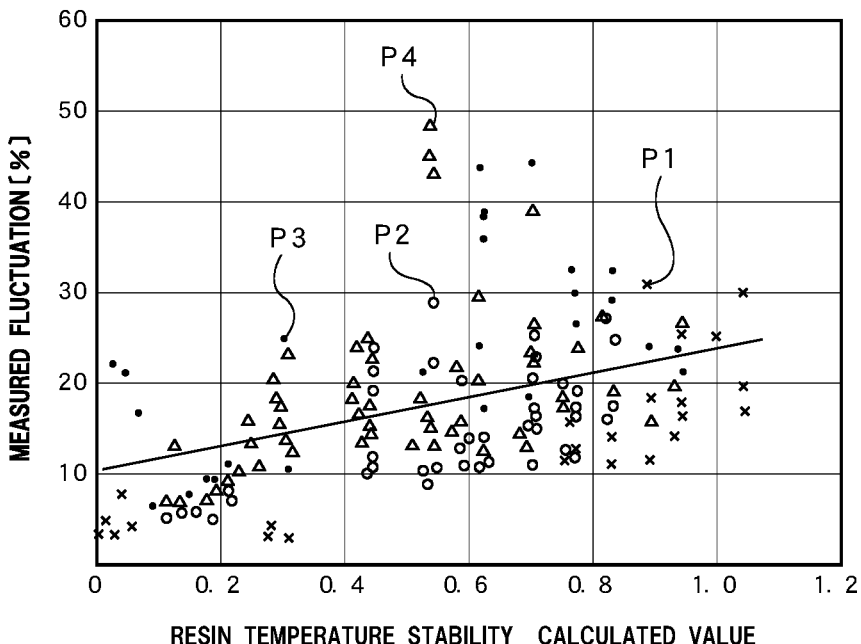
FIG. 7 Characteristic chart showing the correlation between calculated values and measured values relating to resin temperature stability (fluctuation), which was used for verification of the molding assistance device.
Figure 8:
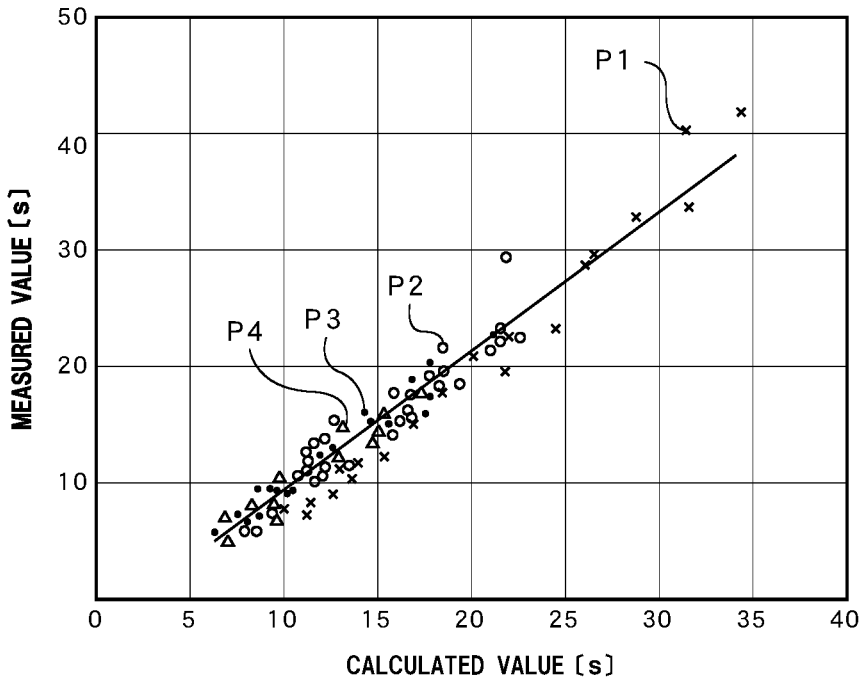
FIG. 8 Characteristic chart showing the correlation between calculated values and measured values relating to plasticization time, which was used for verification of the molding assistance device.

FIGS. 6 to 8 show the results of this verification. FIG. 6 is a correlation chart which relates to weight-average fiber length and shows the relation between measured breakage rate [%] and calculated breakage rate [%]. FIG. 7 is a correlation chart which relates to resin temperature stability and shows the relation between measured fluctuation [° C.] and calculated breakage rate [%]. FIG. 8 is a correlation chart showing the relation between measured values and calculated values of the plasticization time. In FIGS. 6 to 8, P1 (X) shows sample 1, P2 (O) shows sample 2, P3(●) shows sample 3, and P4 (△) shows sample 4.

In FIGS. 6 to 8, the correlativity of weight average fiber length of FIG. 6 and the correlativity of plasticization time of FIG. 8 show good results. Therefore, it is possible to determine that prediction can be performed with sufficient accuracy. Meanwhile, as to the resin temperature stability of FIG. 7, accuracy is somewhat poor. The conceivable reason of this poor accuracy is that the thermal conductivity of reinforcing fibers is relatively high and their specific heat is relatively low; so that generated heat is easily discharged to the outside. Therefore, it is supposed that accurate values cannot be displayed by using a thermocouple for temperature measurement.

The calculation processing functional section Fc includes an judgment processing section Fcj which performs judgment processing for the magnitude of at least one of the estimated solid phase rate Xcs, the estimated final fiber length Yf, the estimated breakage rate Yn, and the estimated resin decomposition rate Xrs, and outputs assistance message data md corresponding to a judgment result mj: i.e., the result of the judgment processing. In the case where, as descried above, the an judgment processing section Fcj, which performs judgment processing for the magnitude of at least one of the estimated solid phase rate Xcs, the estimated final fiber length Yf, the estimated breakage rate Yn, and the estimated resin decomposition rate Xrs, and outputs an assistance message data md corresponding to the judgment result mj: i.e., the result of the judgment processing, is provided in the calculation processing functional section Fc, an operator can easily grasp the molten state of molten resin, which is difficult to judge, and can quickly perform necessary countermeasure processing.

Furthermore, the molding assistance device 1 includes an output processing functional section Fo which has a function of displaying, on a message display section 5v of the display 5, an assistance message mdd based on the assistance message data md outputted from the judgment processing section Fcj, as shown in FIG. 1. In the case where, as described above, the function of displaying, on the message display section 5v of the display 5, the assistance message mdd based on the assistance message data md outputted from the judgment processing section Fcj is provided in the output processing functional section Fo, the operator can easily grasp the molten state of the molten resin, which is difficult to judge, by the visual means and can quickly perform necessary countermeasure processing. Therefore, production of molded products can be made more efficient.

In accordance with the assistance program Ps, an output screen 36 shown in FIG. 1 is displayed on the display 5. This output screen 36 has an estimated solid phase rate display section 36a provided in an upper part, an estimated reinforcing fiber breakage rate display section 36b provided in a middle part, and a final data display section 36c provided in a lower part and including a display section for displaying other data. Accordingly, the output screen 36 functions as the output processing functional section Fo which displays on the display 5 a piece of information relating to at least one of the estimated solid phase rate Xcs and the estimated breakage rate Yn.

On the output screen 36, the estimated solid phase rate display section 36*a* shows a graph of estimated solid phase rate in which the horizontal axis shows screw position, and the vertical axis shows the estimated solid phase rate Xcs obtained through calculation. A characteristic curve of an estimated solid phase rate Xcs illustrated in FIG. 1 shows a nearly normal state. Of imaginary line curves illustrated as other patterns, the imaginary line curve Xcsd shows a state in which plasticization proceeds excessively because of an excessively early melting position, and the imaginary line curve Xcsu shows a state in which plasticization is insufficient because of an excessively late melting position.

The estimated breakage rate display section 36*b* of FIG. 1 shows a graph of estimated reinforcing fiber breakage rate in which the horizontal axis shows screw position, and the vertical axis shows the estimated breakage rate Yn obtained through calculation. The characteristic curve of the estimated breakage rate Yn displayed in the estimated breakage rate display section 36*b* of the output screen 36 becomes the same as the characteristic curve showing the results of the above-described simulation shown in FIG. 4.

Since the estimated solid phase rate Xcs and the estimated breakage rate Yn are displayed graphically, it is possible to easily predict whether or not they are appropriate on the basis of their graph patterns. Furthermore, in the final data display section 36*c*, a carbonization generation rate 36*ca* (estimated resin decomposition rate Xrs), a heat generation amount 36*cb*, a residual solid matter amount 36*cc*, and a plasticization time 36*cd* are displayed, in the form of numerical values, in this order from the upper side, and the final fiber length Yf is displayed, in the form of a numerical value, as the state of the added reinforcing fibers. On the lower side of the final data display section 36*c*, the message display section 5*v*, which is composed of a judgment result display section 36*ce* and an assistance message display section 36*cf*, is provided. In the judgment result display section 36*ce*, the judgment result mj (the result of judgment based on estimation (prediction) of various type of data) is displayed by displaying "Best," "Good," "Acceptable," "Unacceptable," etc. (in the illustrated example, "Unacceptable" is displayed), and an assistance message mdd based on this judgment result mj is displayed. In the illustrated example, an assistance message indicating that "Please reconsider all conditions" is displayed.

Figure 9:
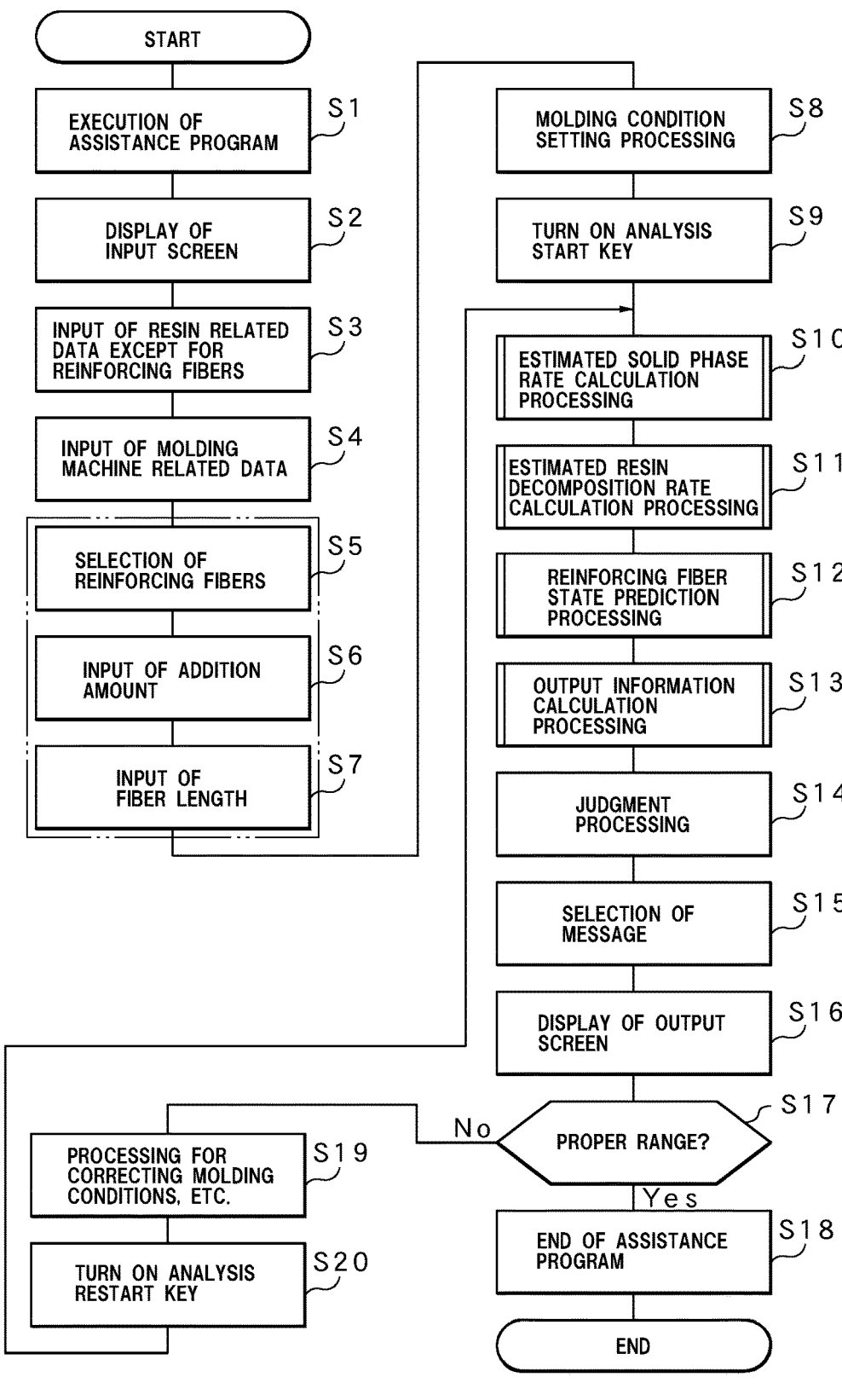
FIG. 9 Flowchart used for describing processing steps of a molding assistance method performed by using the molding assistance device.

Next, a molding assistance method performed by using the molding assistance device 1 of the present embodiment will be described in accordance with the flowchart shown in FIG. 9 and with reference to the drawings.

Basically, this molding assistance method performed by using the molding assistance device 1 can be used when molding conditions are set before start of production, and is executed by the assistance program Ps stored in the internal memory 21*m*.

First, the operator starts up the assistance program Ps (step S1). As a result, an input screen 31 shown in FIG. 3 and having a setting function is displayed on the display 5 (step S2). The operator inputs various types of necessary data by using the data input section Fi of the input screen 31. Namely, the operator inputs the resin related data Dr (step S3) and inputs the molding machine related data Dm (step S4).

In order to input the resin related data Dr, the operator selects the type of resin by using a resin selection section 31*a* and inputs data of flowability (MFR) of molten resin by using a flowability input section 31*b*. Therefore, in this case, pieces of information regarding reinforcing fibers are not contained in the resin related data Dr.

Also, in order to input the molding machine related data Dm, the operator selects the type of the screw by using a screw selection section 33*a* and selects the type of the molding machine by using a molding machine selection section 33*b*. Notably, as a result of the selection preformed by using the molding machine selection section 33*b*, heating cylinder data, etc., which relate to the molding machine, are inputted. Furthermore, as a result of selection of the type of the screw; a plurality of types of data relating to the screw are inputted. Specifically, data relating to various dimensions (e.g., the screw outer diameter, the screw flight width, the friction coefficient between a piece of solid matter and the screw; the screw groove depth, the screw width direction length, the screw lead, the flight coefficient, the screw flight torsion angle, and the pitch number) and data relating to the type of the material of the screw surface 3*f* are inputted. In particular, in the case where the data relating to the type of the material of the screw surface 3*f* is contained in the screw data, since causes of degradation (e.g., the catalyst effect by the metal material of the screw surface 3*f* on molten resin and easiness of adhesion) can be reflected on calculation of the estimated resin decomposition rate Xrs, a more accurate (or precise) estimated resin decomposition rate Xrs can be obtained.

Meanwhile, according to the present invention, the operator inputs or selects pieces of information relating to the reinforcing fibers, as the resin related data Dr, by using the reinforcing fiber input section 32. Namely, the operator selects the type of the reinforcing fibers by using the fiber type input section 32*a* (step S5), inputs the addition amount of the reinforcing fibers by using the addition amount input section 32*b* (step S6), and selects or inputs a fiber length by using the fiber length input section 32*c* (step S7).

After that, processing of setting molding conditions for molding by the injection molding machine M is performed (step S8). In this case, in accordance with an ordinary setting procedure, a predetermined setting scree 35 (its detailed view is omitted) is displayed on the display 5. The operator sets the molding conditions (molding condition data Ds) relating to various physical quantities such as screw rotational speed, metering time, back pressure, metering position, forward portion temperature, middle portion temperature, rear portion temperature, cycle time, etc.

Upon completion of the series of data input processing and molding condition setting processing, the operator turns on (touches) a "flow analysis start" key 38 displayed on the input screen 31 shown in FIG. 3 (step S9). As a result, in the solid phase rate calculation processing section Fcp, calculation processing based on the inputted input data Di, the set molding condition data Ds, and the solid phase rate calculation expression data Dsc is performed (step S10). As a result of this calculation processing, the estimated solid phase rate Xcs based on the input data Di and the molding condition data Ds is calculated. Also, in the decomposition rate calculation processing section Fcr, calculation processing based on the input data Di, the molding condition data Ds, and the decomposition rate calculation expression data Dsr is performed (step S11). As a result of this calculation, the estimated resin decomposition rate Xrs based on the input data Di and the molding condition data Ds is calculated.

Furthermore, the estimated final fiber length Yf and the estimated breakage rate Yn of the reinforcing fibers in discharged resin at the time of completion of metering are obtained by the fiber state calculation processing section Fcf. In this case, the reinforcing fiber breakage rate Yn and the final fiber length Yf are estimated on the basis of the input data Di by using a previously set calculation expression, data table, or the like (step S12). Also, other various types of pieces of output information (specifically, carbonization generation rate [%], heat generation amount [° C.], residual solid matter amount [%], plasticization time [s], etc.) are obtained by calculation processing or the like (step S13).

Upon completion of the calculation processing, including estimation processing relating to the above-described output information, in the judgment processing section Fcj, judgment processing is performed for the estimated solid phase rate Xcs, the estimated resin decomposition rate Xrs, the estimated final fiber length Yf, the estimated breakage rate Yn, and the various types of pieces of output information in accordance with predetermined judgment criteria (step S14). Furthermore, on the basis of the judgment result mj (i.e., the result of the judgment processing), assistance message data md corresponding to this judgment result mj are selected and outputted (step S15). As a result, the output screen 36 shown in FIG. 1 is displayed on the display 5 by the output processing functional section Fo. Therefore, the operator can check the obtained various pieces of output information (step S16).

In the case where the operator checks the pieces of output information, finds that the judgment result mj (the result of the judgment processing) is "Best," "Good," or "Acceptable." and determines that molding is possible, the operator ends the assistance program (steps S17 and S18). Meanwhile, in the case where the judgment result mj (the result of the judgment processing) is "Unacceptable." the operator performs correction processing such as correction of the molding condition data Ds or changing of the input data Di (step S19). Upon completion of correction, the operator turns on (touches) an "analysis restart" key (step S20). The above-described "flow analysis start" key 38 may be used as this "analysis restart" key. As a result, a series of processing in step S10 and steps subsequent thereto are performed (step S10, etc.). Notably, FIG. 1 shows an example case where the judgment result mj (the result of the judgment processing) is "Unacceptable," and the assistance message mdd indicating that "Please reconsider all conditions" is displayed.

Although the above is description of the basic function (the method of use) of the molding assistance device 1, as shown in FIG. 2, an optimization processing section Fce may be provided in the calculation processing functional section Fc so as to further optimize the molten state of the reinforcing fiber-containing molten resin in the heating cylinder 4. In this case, it is possible to set constraints based on mathematical programing for the molding conditions, and perform optimization for at least one of the estimated solid phase rate Xcs, the estimated final fiber length Yf, the estimated breakage rate Yn, and the estimated resin decomposition rate Xrs.

Namely, physical quantities such as screw rotational speed, back pressure, metering position, cycle time, injection time, set temperatures, and plasticization time are set as constraints, and minimum values and maximum values for these physical quantities are set as pieces of constraint information. For the estimated solid phase rate Xcs obtained through calculation, calculation for the optimization processing is performed by optimal mathematical processing means on the basis of the above-described pieces of constraint information and the input data Di, which serves as the basic information. In this optimal mathematical processing means, calculation is performed in such a manner that the estimated solid phase rate Xcs becomes 0 (optimal condition) or becomes close to 0. Such optimization processing can be similarly performed for the estimated final fiber length Yf, the estimated breakage rate Yn, and the estimated resin decomposition rate Xrs by utilizing the optimization processing section Fce.

In the case, as described above, the optimization processing section Fce, which sets the constraints based on mathematical programing for the molding conditions and obtains at least one of optimized values of the estimated solid phase rate Xcs, the estimated final fiber length Yf, the estimated breakage rate Yn, and the estimated resin decomposition rate Xrs of the reinforcing fiber-containing molten resin in the heating cylinder 4 is provided in the calculation processing functional section Fc, the fiber orientation, fiber length, and the state of dispersion within molded products and the strength of the molded products can be predicted in more detail by reflecting the above-described optimized values on resin flow analysis software or the like.

The molding assistance device 1 according to the present embodiment includes, as basic configurational elements.

the data input section Fi for inputting the resin related data Dr which include, in addition to resin data representing the type of resin, the reinforcing fiber data Drg relating to the reinforcing fibers added to the resin, and the molding machine related data Dm including the screw data Dms:

the molding condition setting section Fx for setting the molding conditions:

the calculation expression data setting section Fs in which the solid phase rate calculation expression data Dsc is set, the solid phase rate calculation expression data Dsc being used for calculation of the solid phase rate Xc of the reinforcing fiber-containing molten resin in the heating cylinder 4 on the basis of the input data Di inputted from the data input section Fi and the molding condition data Ds set by the molding condition setting section Fx:

the calculation processing functional section Fc, which includes the solid phase rate calculation processing section Fcp for obtaining the estimated solid phase rate Xcs of the reinforcing fiber-containing molten resin at the time of completion of metering by calculation processing based on the solid phase rate calculation expression data Dsc, and the fiber state calculation processing section Fcf for obtaining the estimated breakage rate Yn of the reinforcing fibers at the time of completion of metering; and the output processing functional section Fo for performing processing of displaying on the display 5 a piece of information relating to at least one of the estimated solid phase rate Xcs and the estimated breakage rate Yn.

Therefore, even in the case of use of resin containing reinforcing fibers (fiber-reinforced plastic) in which physical properties change drastically and prediction of plasticization time, etc. is not easy, since the visualization of its molten state becomes possible, the molten state of the reinforcing fiber-containing molten resin at the time of completion of metering can be grasped accurately. Thus, human judgment, which requires experience, etc. becomes unnecessary, and even a novice operator who does not have much experience can reduce molding defects and maintenance work and can improve the yield of molded products and molding quality. Accordingly, more desired molding (production) can be performed.

The best embodiment has been described in detail. However, the present invention is not limited to such embodiment, and, as to structures of details, shapes, raw materials, materials, quantities, numerical values, methods, etc., alteration, addition, and deletion can be performed arbitrarily within a range not departing from the gist of the present invention.

For example, the case where the type of reinforcing fibers, the addition amount to resin, and the fiber length are contained as the reinforcing fiber data Drg has been shown. However, other pieces of information may be contained in the reinforcing fiber data Drg. Also, the piece of information relating to the type of resin and the resin flowability data have been shown as examples of the resin related data Dr. However, other pieces of information may be contained in the resin related data Dr. The screw data Dms has been shown as the molding machine related data Dm. However, heating cylinder data and other various types of pieces of information relating to the molding machine may be contained in the molding machine related data Dm. Furthermore, the estimated breakage rate Yn and the estimated final fiber length Yf have been shown as example pieces of estimated information of reinforcing fibers obtained by the calculation processing functional section Fc. However, other pieces of estimated information may be added, and the case where only the estimated breakage rate Yn is used is not excluded. The touch panel 5t of the display 5 has been shown as an example of the data input section Fi. However, various input means may be used as the data input section Fi for the case where data of an external memory storing the input data Di are transferred or are transmitted by communication means, or all data are registered in the internal memory 21m in advance and the input data Di are selected from all the data. The solid phase rate calculation expression data Dsc and the decomposition rate calculation expression data Dsr are mere examples, and other calculation expression data from which the solid phase rate Xc and the resin decomposition rate Xr can be obtained are not excluded. Furthermore, as to the pieces of output information displayed by the output processing functional section Fo, the estimated solid phase rate Xcs and the estimated breakage rate Yn are indispensable pieces of information, and the estimated resin decomposition rate Xrs and the estimated final fiber length Yf are desirably displayed but not indispensable pieces of information in the present invention. Also, the judgment processing section Fcj is desirably configured to make comprehensive judgment in consideration of all the estimated solid phase rate Xcs, the estimated breakage rate Yn, the estimated final fiber length Yf, and the estimated resin decomposition rate Xrs. However, the case where the judgment processing is performed for the magnitude of at least one of these estimated values is not excluded.

INDUSTRIAL APPLICABILITY

The molding assistance device according to the present invention can be used for various injection molding machines which perform molding by injecting plasticized molten resin by means of a screw into a mold, thereby filling the mold with the resin.

The invention claimed is:

1. A molding assistance device for an injection molding machine, the molding assistance device performing molding assistances for the injection molding machine, the injection molding machine performing molding by injecting plasticized molten resin with a screw into a mold so as to fill the mold with the resin, the molding assistance device comprising:

a data input section for inputting resin related data and molding machine related data, the resin related data including, in addition to resin data representing a type of resin, reinforcing fiber data relating to reinforcing fibers added to the resin, the molding machine related data including at least screw data;

a molding condition setting section for setting molding conditions;

a calculation expression data setting section in which solid phase rate calculation expression data are set, the solid phase rate calculation expression data being used for calculation of a solid phase rate of the molten resin containing the reinforcing fibers in a heating cylinder on the basis of input data inputted from the data input section and molding condition data set by the molding condition setting section;

a calculation processing functional section including at least a solid phase rate calculation processing section and a fiber state calculation processing section, the solid phase rate calculation processing section obtaining an estimated solid phase rate of the molten resin containing the reinforcing fibers at the time of completion of metering by calculation processing based on the solid phase rate calculation expression data, the fiber state calculation processing section obtaining an estimated breakage rate of the reinforcing fibers at the time of completion of metering; and an output processing functional section, the output processing functional section performing processing of displaying on a display a piece of information relating to at least one of the estimated solid phase rate and the estimated breakage rate, wherein the reinforcing fiber data contain data representing a type of the reinforcing fibers, an amount of the reinforcing fibers added to the resin, and a fiber length.

2. The molding assistance device for an injection molding machine according to claim 1, wherein decomposition rate calculation expression data are set in the calculation expression data setting section, the decomposition rate calculation expression data being used for calculation of a resin decomposition rate of a screw surface during molding on the basis of the input data and the molding condition data.

3. The molding assistance device for an injection molding machine according to claim 2, wherein the calculation processing functional section includes a decomposition rate calculation processing section, the decomposition rate calculation processing section obtaining an estimated resin decomposition rate by calculation processing based on the input data, the molding condition data, and the decomposition rate calculation expression data.

4. The molding assistance device for an injection molding machine according to claim 1, wherein the fiber state calculation processing section has a function of obtaining an estimated final fiber length of the reinforcing fibers at the time of completion of metering.

5. The molding assistance device for an injection molding machine according to claim 4, wherein the calculation processing functional section includes a judgment processing section, the judgment processing section performing judgment processing for the magnitude of at least one of the estimated solid phase rate, the estimated final fiber length, the estimated breakage rate, and the estimated resin decomposition rate, and outputting assistance message data corresponding to a judgment result of the judgment processing.

6. The molding assistance device for an injection molding machine according to claim 5, wherein the output processing functional section has a function of displaying an assistance message on a message display section of the display, the assistance message being based on the assistance message data outputted from the judgment processing section.

7. The molding assistance device for an injection molding machine according to claim 4, wherein the calculation processing functional section includes an optimization processing section, the optimization processing section setting constraints based on mathematical programing for the molding conditions and obtaining at least one of optimized values of the estimated solid phase rate, the estimated final fiber length, the estimated breakage rate, and the estimated resin decomposition rate of the molten resin containing the reinforcing fibers in the heating cylinder.

\*    \*    \*    \*    \*